United States Patent
Tanabe et al.

(10) Patent No.: US 6,271,966 B1
(45) Date of Patent: *Aug. 7, 2001

(54) OPTICAL HEAD DEVICE INCLUDING AN OPTICALLY ANISOTROPIC DIFFRACTION GRATING AND PROCESS FOR ITS PRODUCTION

(75) Inventors: Yuzuru Tanabe; Tomoki Gunjima; Hiromasa Sato; Hiroki Hotaka, all of Yokohama (JP)

(73) Assignee: Asahi Glass Company Ltd., Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 09/524,742

(22) Filed: Mar. 13, 2000

Related U.S. Application Data

(62) Division of application No. 09/043,908, filed as application No. PCT/JP96/02872 on Oct. 3, 1996, now Pat. No. 6,118,586.

(30) Foreign Application Priority Data

| Oct. 3, 1995 | (JP) | 7-256538 |
| Nov. 1, 1995 | (JP) | 7-285255 |
| Dec. 22, 1995 | (JP) | 7-335418 |
| Jun. 19, 1996 | (JP) | 8-158579 |

(51) Int. Cl.[7] ............................. G02B 5/18; G11B 11/00
(52) U.S. Cl. .................. 359/566; 359/576; 359/494; 359/369; 349/201; 369/112; 369/110
(58) Field of Search .................... 359/558, 566, 359/569, 571, 576, 494, 495; 369/109, 110, 112, 44.12; 349/201, 202

(56) References Cited

U.S. PATENT DOCUMENTS

| 3,843,231 | 10/1974 | Borel et al. |
| 4,251,137 | 2/1981 | Knop et al. |
| 5,142,385 | 8/1992 | Anderson et al. |
| 5,168,485 | 12/1992 | Lehureau et al. |
| 5,299,289 | 3/1994 | Omae et al. |
| 5,495,461 | 2/1996 | Komma et al. |
| 5,594,713 | 1/1997 | Komma et al. |
| 5,739,952 | 4/1998 | Takeda et al. |
| 6,118,586 * | 9/2000 | Tanabe et al. ............... 359/566 |

FOREIGN PATENT DOCUMENTS

| 54-121150 | 9/1979 | (JP) |
| 59-151109 | 8/1984 | (JP) |
| 61-262705 | 11/1986 | (JP) |
| 63-503102 | 11/1988 | (JP) |
| 3-274272 | 12/1991 | (JP) |
| 3-283024 | 12/1991 | (JP) |
| 4-149553 | 5/1992 | (JP) |

(List continued on next page.)

*Primary Examiner*—Jon Henry
(74) *Attorney, Agent, or Firm*—Oblon, Spivak, McClelland, Maier & Neustadt, P.C.

(57) ABSTRACT

An object is to provide an optical head device whereby the light utilization efficiency can be increased and which can be produced at a low cost.

A glass substrate 1 having projections and recesses 2 formed by patterning a SiON type transparent thin film on its inner surface by dry etching, and a second glass substrate 3 having a polyimide film 4 formed as an alignment film on its inner surface, are laminated with a space, the periphery is sealed by a sealing material made of an epoxy resin 5, and liquid crystal 6 is injected under vacuum into the interior to form an optically anisotropic diffraction grating. On the outer surface of this second glass substrate 3, a quarter-wave film 7 is laminated, and a third glass substrate 9 is bonded by a photopolymer 8 to obtain a diffracting element 10. This diffracting element 10 is disposed between a light source and an optical recording medium to obtain an optical head device.

2 Claims, 3 Drawing Sheets

FOREIGN PATENT DOCUMENTS

| | | |
|---|---|---|
| 4-149841 | 5/1992 | (JP) . |
| 4-337702 | 11/1992 | (JP) . |
| 5-10079 | 1/1993 | (JP) . |
| 5-107412 | 4/1993 | (JP) . |
| 5-128583 | 5/1993 | (JP) . |
| 6-88907 | 3/1994 | (JP) . |
| 6-258816 | 9/1994 | (JP) . |

* cited by examiner

US 6,271,966 B1

OPTICAL HEAD DEVICE INCLUDING AN OPTICALLY ANISOTROPIC DIFFRACTION GRATING AND PROCESS FOR ITS PRODUCTION

This is a divisional of application Ser. No. 09/043,908, filed Mar. 31, 1998, now U.S. Pat. No. 6,118,586 which is a 371 of PCT/JP96/02872 filed Oct. 3, 1996.

TECHNICAL FIELD

The present invention relates to an optical head device for writing optical information on or reading out optical information from optical discs and magneto-optical discs such as CD (compact disks), CD-ROM and video discs, and a process for its production.

BACKGROUND ART

Heretofore, as an optical head device for writing optical information on or reading out optical information from optical discs and optical magnetic discs, one using a prism type beam splitter, and one using a diffraction grating or hologram element, as an optical part for introducing (beam splitting) a signal light reflected from the recording surface of a disc to a detecting section, have been known.

Heretofore, the diffraction grating or the hologram element for an optical head device has been prepared by forming a rectangular grating (relief) having a rectangular cross-section on a glass or plastic substrate by a dry etching method or an injection molding method, thereby to diffract light and provide a beam splitting function.

Further, in a case where it is attempted to improve the light utilization efficiency over an isotropic diffraction grating whereby the light utilization efficiency is about 10%, it is conceivable to utilize polarization. For utilizing polarization, there has been a method of increasing the go and return efficiency by increasing the efficiency of both going (in the direction from the light source to the recording surface) and returning (in the direction from the recording surface to the detecting section) by combining a quarter-wave sheet to a prism type beam splitter.

However, the prism type polarized beam splitter is expensive, and other systems have been sought. As one system, a method has been known in which a flat plate of berefringence crystal such as $LiNbO_3$ is used, and an anisotropic diffraction grating is formed on its surface to provide deflection selectivity. However, the berefringence crystal itself is expensive, and it is difficult to apply such a method to the consumer product field.

With the isotropic diffraction grating, the utilization efficiency in going (in the direction from the light source to the recording surface) is about 50%, and the utilization efficiency in returning (in the direction from the recording surface to the detecting section) is 20%, as mentioned above, whereby the go and return utilization is at a level of 10% at best.

It is an object of the present invention to solve the above-described problems and to provide an optical head device which improves the light utilization efficiency and which can be prepared at a low cost with high productivity, and a process for its production.

DISCLOSURE OF THE INVENTION

The present invention provides an optical head device whereby writing of information and/or reading out of information is carried out by irradiating light from a light source on an optical recording medium through a diffracting element, wherein the diffracting element is provided with an optically anisotropic diffraction grating having lattice-like projections and recesses formed on the surface of a transparent substrate, and liquid crystal having an optical anisotropy filled in said projections and recesses.

Further, the present invention provides a process for producing an optical head device whereby writing of information and/or reading out of information is carried out by irradiating light from a light source on an optical recording medium through a diffracting element, which comprises coating a transparent thin film on the surface of a transparent substrate for the diffracting element, then forming lattice-like projections and recesses on the transparent thin film by a photolithographic method, and filling liquid crystal having an optical anisotropy in said projections and recesses to form an optically anisotropic diffraction grating.

BEST MODE FOR CARRYING OUT THE INVENTION

Figure 1:
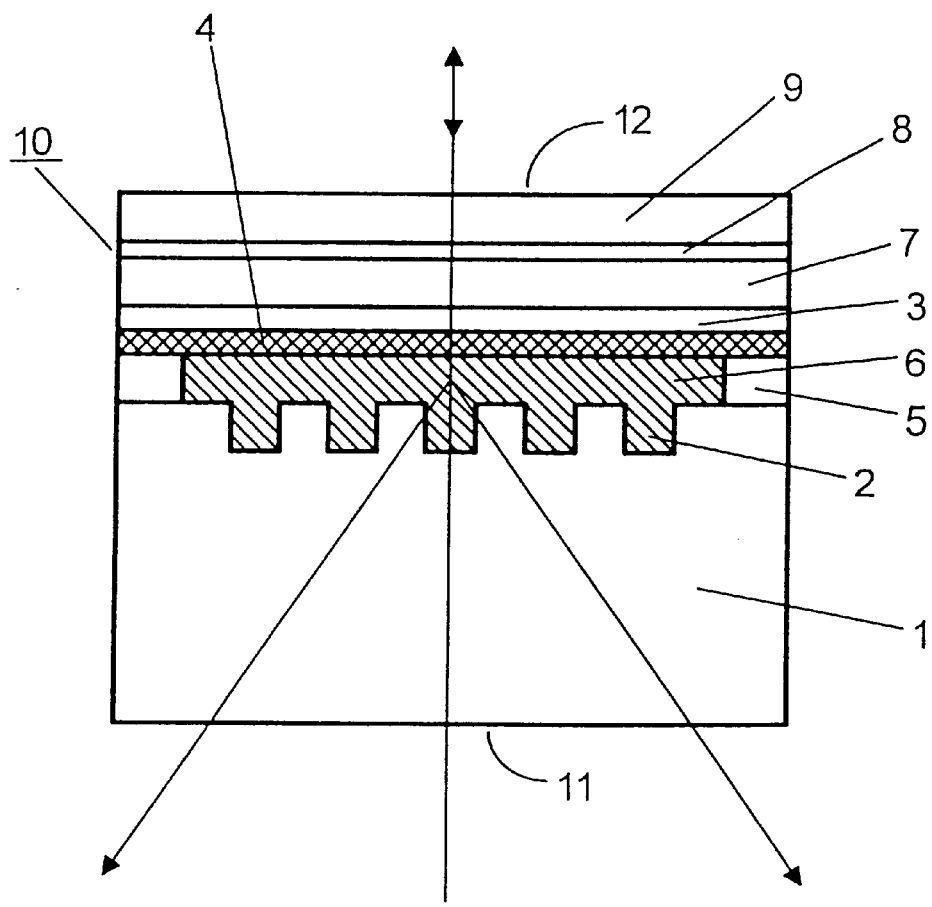
FIG. 1 is a transverse cross-sectional view of a basic structure of a diffracting element employing an optically anisotropic diffraction grating by means of liquid crystal, representing Example 1.

In the above first invention, if the above projections and recesses are made of an optically isotropic material and its refractive index is substantially equal to the ordinary refractive index or extraordinary refractive index of the above liquid crystal, they function as an optically anisotropic diffraction grating utilizing polarization of light. It is particularly preferred that the refractive index is substantially equal to the ordinary refractive index, since the range for selection of the transparent substrate material having such projections and recesses will thereby be wide, and a diffracting element of good quality can be prepared at a low cost. Further, in a case where the refractive index of the projections and recesses is to be adjusted to be substantially equal to the extraordinary refractive index of the liquid crystal, one having a high refractive index (refractive index: 1.58) such as a polycarbonate can be effectively used as the transparent substrate material.

Also in a case where the above projections and recesses are made of an optically anisotropic material, and the refractive index $n_{lg}$ of the projections and recesses corresponding to the ordinary refractive index of liquid crystal is substantially equal to the ordinary refractive index of the above liquid crystal, they function as an optically anisotropic diffraction grating utilizing polarization of light. The refractive indices $n_{lg}$ and $n_{le}$ of the projections and recesses corresponding to the ordinary refractive index and the extraordinary refractive index of the above liquid crystal mean refractive indices in the same directions as the directions showing the ordinary refractive index and the extraordinary refractive index of the liquid crystal (the directions corresponding to the incidence direction and the polarized direction of light).

Here, if the refractive index $n_{le}$ of the projections and recesses corresponding to the extraordinary refractive index of the liquid crystal, is smaller than the above refractive index $n_{lg}$ of the projections and recesses, the difference between the extraordinary refractive index of the liquid crystal and the refractive index $n_{le}$ of the projections and recesses, will be larger, whereby the depth of the diffraction grating required to obtain the desired diffraction efficiency, may be shallow, such being desirable.

Also in a case where the above projections and recesses are made of an optically anisotropic material, and the refractive index $n_{le}$ of the projections and recesses corresponding to the extraordinary refractive index of the liquid crystal, is substantially equal to the extraordinary refractive index of the above liquid crystal, they function as an optically anisotropic diffraction grating utilizing polarization of light. Here, the refractive index $n_{lg}$ of the projections and recesses corresponding to the ordinary refractive index of the liquid crystal, is larger than the above refractive index $n_{le}$ of the projections and recesses, the difference between the ordinary refractive index of the liquid crystal and the refractive index $n_{lg}$ of the projections and recesses, tend to be larger, whereby the depth of the diffraction grating required to obtain a desired diffraction efficiency, may be shallow, such being desirable.

In the present invention, the structure may basically be such that liquid crystal is filled in the recesses of the substrate having the projections and recesses formed thereon. An optically anisotropic diffraction grating is formed by the liquid crystal filled in the recesses and the projections of the substrate. It is preferred to use a substrate having projections and recesses formed and a flat substrate having no projections or recesses formed thereon, and to obtain a diffraction element having a structure of a liquid crystal cell having liquid crystal filled therebetween.

It may also be that using a pair of transparent substrates having lattice-like projections and recesses on their surfaces, the surfaces having the projections and recesses formed thereon, are arranged to face each other, and the above-mentioned liquid crystal is filled in their projections and recesses, and the pair of transparent substrates are laminated to form an optically anisotropic diffraction grating. In such a case, the respective projections and recesses may be shallow, and their preparation will be easy, such being preferred. Further, it is preferred also in that the alignment of liquid crystal will be improved by the two facing projections and recesses.

It is preferred that the above-mentioned pair of transparent substrates are laminated so that the projections and recesses formed on them would be asymmetrical about the lamination plane, whereby a diffraction grating having an asymmetrical cross-sectional shape can easily be prepared, and it is possible to make the diffraction efficiency of either one of ±first-order (diffraction) lights larger, so that the light having the larger diffraction efficiency can be detected by a single detector.

As the liquid crystal to be used in the present invention, a known liquid crystal used for a liquid crystal display device such as nematic liquid crystal or smectic liquid crystal, can be used. Further, a polymer liquid crystal may also be used.

In the first invention, the difference Δn between the ordinary refractive index and the extraordinary refractive index of the above liquid crystal is preferably at least 0.05 and at most 0.35. If it is less than 0.05, the projections and recesses are required to be deep, whereby the production tends to be difficult, thus leading to a high cost. If it exceeds 0.35, the liquid crystal tends to be deteriorated by e.g. ultraviolet rays.

As the above transparent substrate, one having a refractive index of from about 1.4 to about 1.6, such as glass, polyolefin or polycarbonate, is preferred, since it is readily adjustable to the ordinary refractive index of about 1.5 of the liquid crystal.

It is preferred that the above projections and recesses are made of an optically isotropic material, and the temperature to satisfy $D\Delta N=\lambda_0/2$ is higher than 30° C., when n is the refractive index of the isotropic material, D is the depth of the above projections and recesses, $n_g$ is the ordinary refractive index of the above liquid crystal, $n_e$ is the extraordinary refractive index of the above liquid crystal, ΔN is the larger one of $|n-n_g|$ and $|n-n_e|$, and $\lambda_0$ is the wavelength in vacuum of the light from a light source. Namely, when $D\Delta N=\lambda_0/2$, the go and return efficiency by diffraction becomes highest, but ΔN varies depending upon the temperature. Accordingly, in order to optimize the temperature characteristic within a range of e.g. from 0 to 60° C., it is preferred to adjust the depth of the projections and recesses so as to satisfy the above relation at a temperature of at least 30° C.

Further, for the same reason as described above, it is preferred that the above projections and recesses are made of an optically anisotropic material, and the temperature to satisfy $D\Delta N=\lambda_0/2$ is higher than 30° C., when $n_{lg}$ is the refractive index of the projections and recesses corresponding to the ordinary refractive index of the liquid crystal, $n_{le}$ is the refractive index of the projections and recesses corresponding to the extraordinary refractive index of the liquid crystal, D is the depth of the above projections and recesses, $n_g$ is the ordinary refractive index of the liquid crystal, $n_e$ is the extraordinary refractive index of the liquid crystal, ΔN is the larger one of $|n_{lg}-n_g|$ and $|n_{le}-n_e|$, and $\lambda_0$ is the wavelength in vacuum of the light from a light source.

It is preferred to laminate a second transparent substrate made of glass or a plastic such as an acrylic resin, polyolefin or polycarbonate and having a thickness of about 1 mm on the optically anisotropic diffraction grating of the above transparent substrate, so that a layer of liquid crystal can be sandwiched and fixed. The liquid crystal may not only fill the projections and recesses, but a portion overflowed from the projections and recesses may form a thin layer of liquid crystal between the transparent substrate and the second transparent substrate. If the distance between the projections on the surface of the transparent substrate on which the projections and recesses are formed, and the second transparent substrate, is too large, the aligning force of liquid crystal by an alignment film formed on the second transparent substrate tends to decrease. Accordingly, it is preferably at most 10 μm, more preferably at most 5 μm. In a case where the second transparent substrate is laminated on the optically anisotropic diffraction grating of the above transparent substrate, and a polyimide film (an alignment film) for aligning liquid crystal is formed on the liquid crystal side of the above second transparent substrate, the damage to the rubbing cloth during rubbing will be small, and the production cost will be small, as compared with the case of forming a polyimide film on the above transparent substrate.

It has been found that with the transparent substrate having lattice-like projections and recesses, the projections and recesses themselves have an aligning effect similar to the rubbed alignment film, and an adequate characteristic as a diffracting element can be obtained by itself without providing an alignment film on the second transparent substrate. In such a case, substantially the same characteristic as in the case where the alignment film is provided, can be obtained, and the production can be carried out at a low cost, since no alignment film has to be provided.

Further, at the time of forming a polyimide film on the second transparent substrate, the rubbing direction for alignment and the direction of stripes of the above projections and recesses (the longitudinal direction of the lattice-like projections and recesses) are preferably adjusted to be the same, whereby it is possible to improve the stability and reproducibility of the alignment of the liquid crystal, to increase $\Delta N$ and to prevent a deterioration of the alignment ratio due to the surrounding environment such as the temperature.

The cross-sectional shapes of the above lattice-like projections and recesses are preferably bilaterally asymmetrical about a plane perpendicular to the longitudinal direction (stripe direction) of the projections and recesses, whereby the diffraction efficiency of either one of +first-order (diffraction) light and −first-order (diffraction) light can be made larger than the other, and only the one having the larger diffraction efficiency may be used so that a large go and return efficiency can be obtained by means of a single detector. The bilateral asymmetrical shapes may, for example, be stepped shapes or sloping (saw-tooth) shapes.

Further, modifications may be made such that distances of the projections and recesses have a distribution, some of the projections and recesses are made to be bilaterally asymmetrical and the rest are made to be bilaterally symmetrical, or some of the projections and recesses are made to be projections, and the rest are made to be recesses.

If a phase difference element such as a phase difference sheet or a phase difference film functioning as a half-wave sheet or a quarter-wave sheet, is laminated on the above optically anisotropic diffraction grating of the transparent substrate, it is possible to let polarization directions cross as between the going direction of light (the direction from the light source side to the optical recording medium side) and the returning direction of light (the direction from the optical recording medium side to the light source side) and thereby to let them function as an optically anisotropic diffraction grating. As the above phase difference sheet or phase difference film, a material such as a polycarbonate or polyvinyl alcohol having a thickness of from a few tens to a few hundreds micrometer, is preferably employed.

It is preferred that at least one side of the above phase difference sheet or phase difference film is covered by an organic resin such as a photopolymer, or a thermosetting epoxy resin, or further, a third transparent substrate such as a glass substrate or a plastic substrate having a good flatness, is bonded by means of the above organic resin, whereby there will be merits such as a reduction of wave front aberration and improvement of the reliability.

It is preferred that the periphery between the above transparent substrate and the second transparent substrate, or the periphery of the entire diffracting element, is sealed by a sealing material such as an epoxy resin, whereby not only leakage of liquid crystal can be prevented, but also undesirable physical or chemical changes of e.g. liquid crystal and organic resins due to changes in the humidity or the temperature of the external environment, can be prevented.

A second diffraction grating which generates three beams for detecting a tracking error, may be provided on the surface (the light source side surface) opposite to the surface of the above transparent substrate on which the projections and recesses are provided. In such a case, detection of a tracking error will be easy, such being desirable. The above-mentioned secondary diffraction grating may be formed by coating a photopolymer or a photoresist, followed by exposure in a predetermined pattern, or may be formed by directly processing the second substrate by a dry etching method.

Further, the projections and recesses on the inner side of one of the pair of transparent substrates, may be used as a diffracting element for generating such three beams.

FIG. 1 is a transverse cross-sectional view illustrating the basic structure of the diffracting element of the present invention.

In FIG. 1, numeral 1 indicates a glass substrate which is a transparent substrate, numeral 2 indicates projections and recesses, numeral 3 indicates a second glass substrate which is a transparent substrate, numeral 4 indicates a polyimide film which is an alignment film, numeral 5 indicates an epoxy resin which is a sealing material, numeral 6 indicates liquid crystal filled between a pair of substrates, numeral 7 indicates a quarter-wave film as a phase difference film, numeral 8 is a photopolymer, numeral 9 is a third glass substrate which is a transparent substrate, numeral 10 indicates a diffracting element, numeral 11 indicates a light incoming side (light source side), and numeral 12 indicates a light outgoing side (optical recording medium side).

Figure 2:
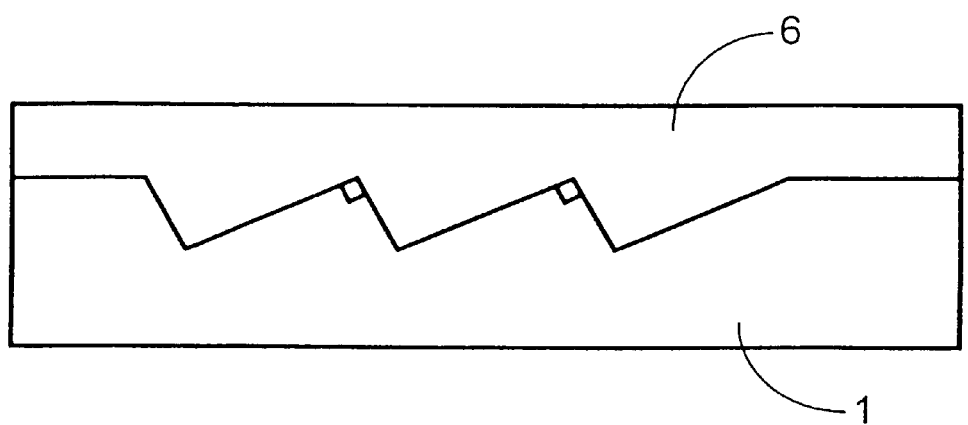
FIG. 2 is a transverse cross-sectional view of a transparent substrate for an optical head device of Example 2.
Figure 3:
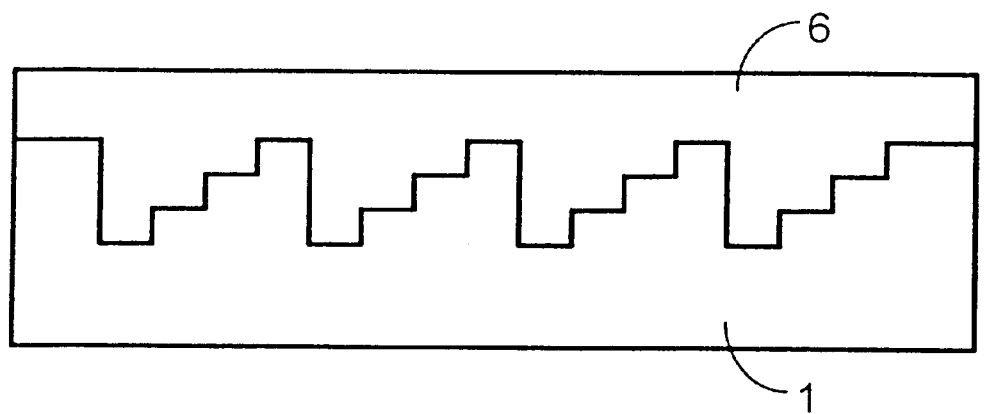
FIG. 3 is a transverse cross-sectional view of a transparent substrate for an optical head device of Example 3.

FIG. 2 is a transverse cross-sectional view of a transparent substrate for an optical head device wherein the projections and recesses 2 are bilaterally asymmetrical saw-tooth shapes. FIG. 3 is a transverse cross-sectional view of a transparent substrate for an optical head device wherein the projections and recesses 2 are bilaterally asymmetrical stepped shapes.

Figure 4:
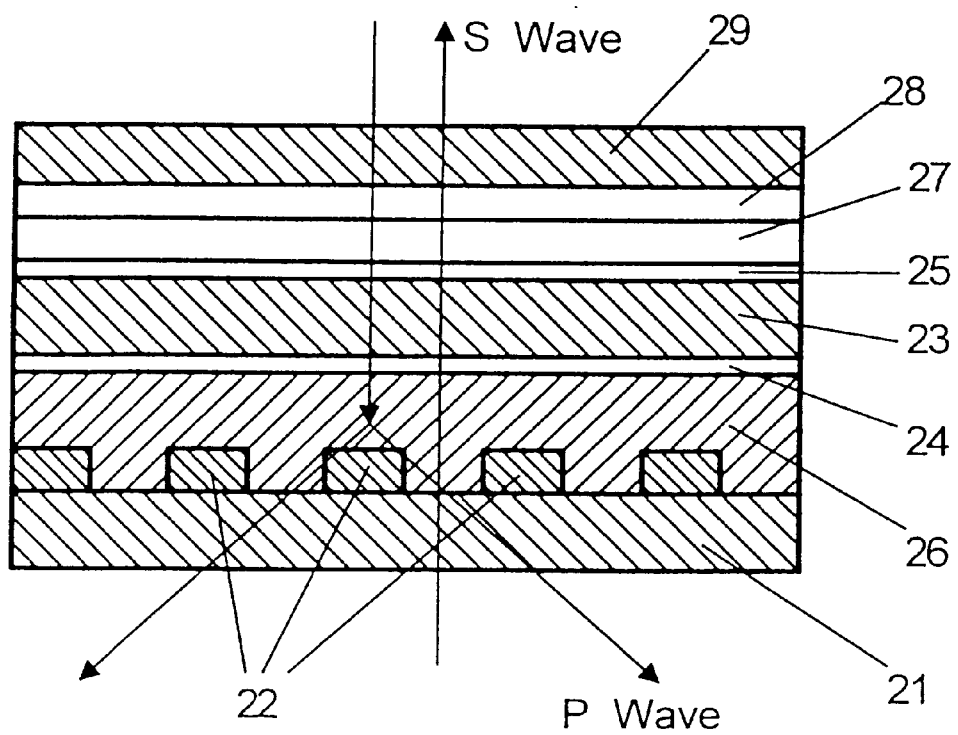
FIG. 4 is a transverse cross-sectional view of a diffracting element of an optical head device of Example 5.
Figure 5:
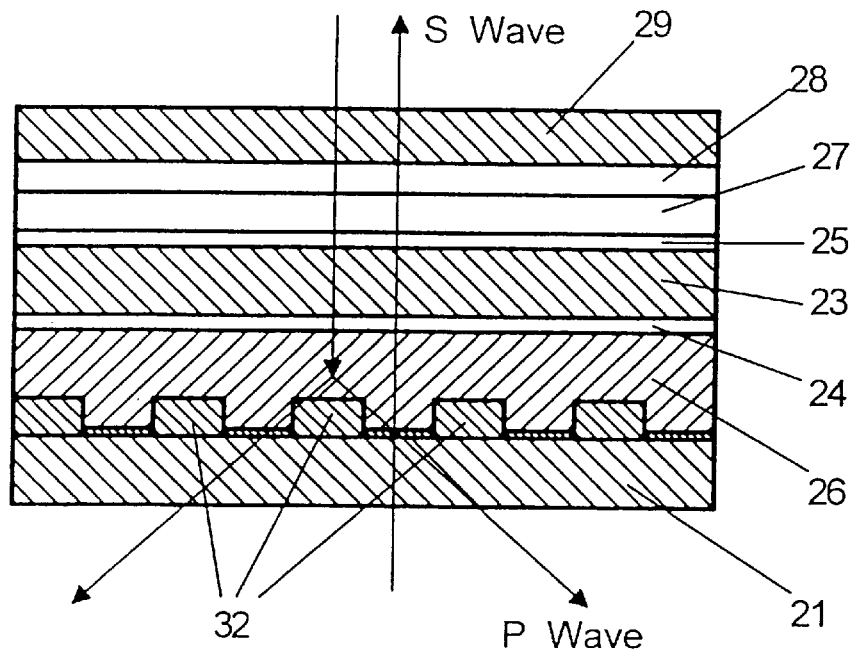
FIG. 5 is a transverse cross-sectional view of a diffracting element of an optical head device of Example 6.

FIGS. 4 and 5 are transverse cross-sectional views of a diffracting element for an optical head device wherein the projections and recesses are formed by a transparent thin film.

In FIGS. 4 and 5, numeral 21 indicates a glass substrate which is a transparent substrate, numerals 22 and 32 indicate projections and recesses, numeral 23 indicates a second glass substrate which is a second transparent substrate, numeral 24 indicates a polyimide film which is an alignment film, numeral 25 indicates a transparent adhesive, numeral 26 indicates liquid crystal filled between the pair of substrates, numeral 27 is a quarter-wave film as a phase difference film, numeral 28 is a photopolymer, and numeral 29 is a third glass substrate which is a third transparent substrate.

The projections and recesses 22 in FIG. 4 show a state where the transparent thin film remains only as projections, and at the recesses, the surface of the first glass substrate 21 as backing is exposed. The projections and recesses 32 in FIG. 5 show a state in which the transparent thin film remains not only as projections but also at the recesses, and the surface of the first glass substrate 21 as backing is not exposed.

Figure 6:
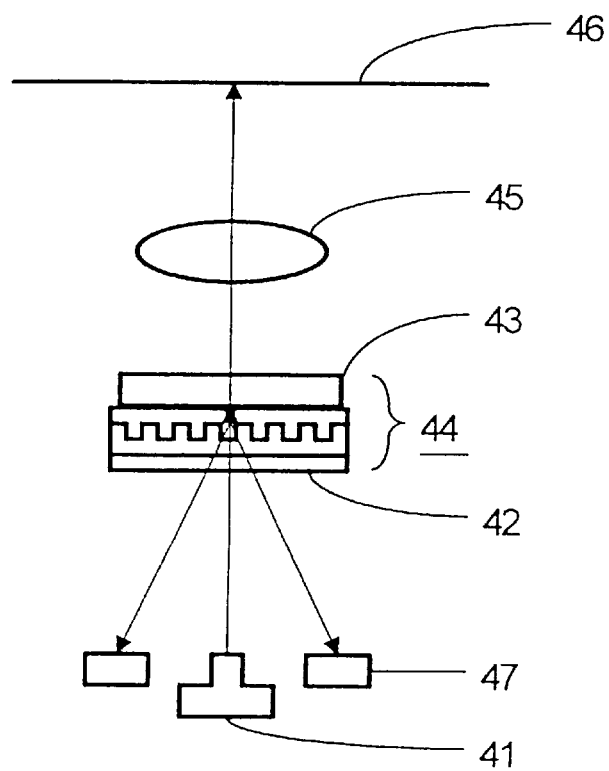
FIG. 6 is a schematic view of a basic structure of the optical head device of the present invention.

FIG. 6 is a schematic view illustrating the basic structural embodiment of the optical head device of the present invention.

In FIG. 6, numeral 41 indicates a light source, numeral 42 indicates an optically anisotropic diffraction grating, numeral 43 indicates a phase difference element, numeral 44 indicates a diffracting element containing the optically anisotropic diffraction grating 42 and the phase difference element 43, numeral 45 indicates an object lens, numeral 46 indicates an optical recording medium, and numeral 47 indicates a detector. In this Figure, the projections and recesses of the diffraction element 44 are formed on the substrate on the optical recording medium side, and the longitudinal direction of the grating of the projections and recesses is directed perpendicular to the paper surface.

In the above description, lattice-like projections and recesses were referred to for the description. However, as mentioned hereinafter, when such projections and recesses are to be formed by a transparent thin film, only projections may be formed by the transparent thin film, and in such a case, the projections and the recesses may have different refractive indices. In such a case, the refractive index of the projections located at the same position as the liquid crystal will be questioned. Accordingly, the refractive index of the projections and recesses used in the above description may be interpreted as the refractive index of the projections.

When the optical head device of the present invention is used for reading out, a detector is usually provided on the light source side to detect reflected light from the optical recording medium. In order to condense the reflected light in a desired beam shape on the light-receiving surface of the detector, an in-plane curvature may be imparted to the optically anisotropic diffraction grating pattern of the diffracting element, or a distribution may be imparted to the grating interval. The above grating pattern may have a curvature distribution and a grating interval distribution designed by a computer and thus may be made to be the optimum pattern for a focusing error detecting method such as a spot size detection method. As the above detector, one utilizing a semiconductor element such as a photodiode or a CCD element, is preferred as it is small in size and light in weight and of a low power consumption type.

By providing an anti-reflection film on the light incoming and outgoing surfaces of the above diffracting element, loss of light can be prevented. In such a case, it is preferred to use an amorphous fluorine resin as the anti-reflection film, whereby film-formation can be carried out at a low cost without using an expensive large size film-forming apparatus such as a vapor deposition apparatus.

In the present invention, it is preferred to provide a coating film of a photopolymer such as a UV-curable acrylic resin on the light source side of the diffraction element and/or the optical recording medium side thereof, whereby wave front aberration caused by the irregularities on the surface of the quarter-wave sheet or the glass substrate, can be reduced. Further, it is preferred to laminate a third transparent substrate such as a glass substrate or a plastic substrate having good flatness on the coating film of photopolymer, whereby the wave front aberration can remarkably be reduced. Thus, as the light incoming and outgoing surfaces of the diffracting element are flattened, the wave front aberration will consequently be reduced.

It is preferred to accommodate the above light source, the diffracting element, the detector, the object lens, etc., in the same package, whereby it is possible to present an optical head device which is small in size and easy for e.g. adjusting the optical axis. As the light source of the present invention, one utilizing a semiconductor element such as a semiconductor laser (LD) or LED, is preferred. Particularly preferred is LD, since it is small in size and light in weight and of a low power consumption type and has a coherence property. Further, as the optical recording medium, an optical disc such as CD, CD-ROM or DVD (digital·video·disc), a magneto-optical disc, a phase change type optical disc, an optical card, or other recording medium for an optical system for writing and/or reading out information by light, can be used.

The projections and recesses of the transparent substrate of the present invention may be formed by directly forming projections and recesses to the substrate material or by providing a transparent thin film on the surface of the substrate. In the case of directly forming projections and recesses to the substrate material, they may be formed by a mechanical processing method such as cutting and grinding, or press-molding, or by a chemical processing method such as etching. In the case of forming a thin film on the substrate material, they may be formed by a mechanical processing method such as cutting and grinding of the thin film or press-molding the thin film, by a chemical processing method such as etching of the thin film, or by a selective deposition method such as masking vapor deposition of the thin film material.

In the present invention, it is particularly preferred to form a transparent thin film on the surface of a transparent substrate. As such a transparent thin film, various types of organic and inorganic transparent thin films may be used. In this manner, adjustment of the refractive index with liquid crystal can be made by the transparent thin film. The refractive index of this transparent thin film may usually be adjusted to the ordinary refractive index or extraordinary refractive index of liquid crystal to be used.

A transparent substrate having a high refractive index is hardly available, and it is therefore difficult to adjust the refractive index with liquid crystal. Therefore, in order to adjust to the extraordinary refractive index of liquid crystal, only the transparent thin film may be made to have a high refractive index, whereby the substrate may be made of a material which is inexpensive, reliable and durable, such as a usual glass substrate. Specifically, when the transparent substrate is a usual glass substrate, the refractive index is at a level of 1.5, and one having a larger refractive index is used.

Specifically, it may be formed by using a transparent material selected from $SiO_xN_y$ ($0 \leq x < 2$, $0 \leq y < 1.3$, refractive index: about 1.5 to 1.9), MgO (refractive index: 1.72), $PbF_2$ (refractive index: 1.75), $Y_2O_3$ (refractive index: 1.87) and a mixture of $Al_2O_3$ and $ZrO_2$ (refractive index: 1.63 to 2.05), or a photosensitive organic material such as a photosensitive polyimide (refractive index: 1.78). Further, a glass film formed by a sol-gel method, or a glass film formed by firing a frit, may also be used.

Among such transparent thin films, it is preferred to use a material composed of $SiO_xN_y$ ($0 \leq x < 2$, $0 \leq y < 1.3$). With this material, the refractive index can be adjusted within a wide range of from about 1.5 to 1.9 by suitably adjusting the ratio of x to y, and it can readily be adjusted to the ordinary refractive index or extraordinary refractive index of liquid crystal. Further, fine processing can readily be carried out by a dry etching method, such being desirable.

More preferably, the refractive index of the above transparent thin film or the projections is at a level of from 1.7 to 1.9, so that it is substantially equal to the extraordinary refractive index (about 1.8) of liquid crystal, and it efficiently functions as a diffraction grating to S-waves as mentioned above. As a transparent substrate having a refractive index which is substantially equal to the ordinary refractive index (about 1.5) of liquid crystal, a glass substrate or a plastic substrate may, for example, be preferably employed.

It is preferred that the above transparent thin film is a $SiO_x$ film ($1 < x < 2$), whereby it is readily possible to prepare projections and recesses having a refractive index which substantially agrees to the ordinary refractive index or extraordinary refractive index of liquid crystal. Further, the above transparent thin film may be made of an organic resin such as an acrylic resin, so that the projections and recesses may be formed by means of a 2P method (a photopolymerization method) or a selective photopolymerization method.

Specifically, the projections and recesses are formed as follows. A photoresist is coated by e.g. a spin coating method, on the surface of a transparent substrate such as a polished glass substrate. A photomask having a predetermined pattern is intimately put on the photoresist film, followed by exposure with ultraviolet rays and further by photoresist development treatment to form a lattice-like pattern of the photoresist on the surface of the transparent substrate. Using the lattice-like pattern of the photoresist further as a mask, dry etching is carried out by means of a gas such as $CF_4$ to form lattice-like projections and recesses for an optically anisotropic diffraction grating, having a depth of from 1 to 6 μm and a pitch of from 2 to 50 μm, particularly a depth of from 1 to 2 μm and a pitch of from 2 to 20 μm.

Otherwise, using the transparent substrate prepared by the above method as a master substrate, an acrylic resin or the like may be cast and molded, or a mold may be prepared based on the above transparent substrate, and a transparent substrate having lattice-like projections and recesses may be prepared by an injection molding method or a 2P method by using a material such as an acrylic resin, a polyolefin, a polycarbonate or a polyethersulfone.

Here, for example, a glass substrate may directly be subjected to dry etching. However, there is a problem that the etching speed is slow and it is difficult to form a constant depth with good reproducibility, or it is difficult to reduce the depth distribution.

Therefore, a film having a refractive index close to the refractive index of the transparent substrate such as a glass substrate, such as a $SiO_2$ film, may be formed by e.g. a vapor deposition method so that the desired depth of projections and recesses can be obtained, whereby dry etching can be carried out with good reproducibility and with a small face distribution by utilizing the difference in the etching speed between the transparent substrate and the $SiO_2$ film. In a case where a transparent thin film and a substrate having a small difference in the refractive index are to be laminated, it is preferred to adjust the difference between the refractive index of the transparent substrate and the refractive index of the transparent thin film such as the $SiO_2$ film to be within 0.1 in order to prevent e.g. undesirable reflection by the interface. This does not apply in a case where a transparent thin film having a high refractive index is to be laminated on a substrate having a low refractive index, to adjust the refractive index to the extraordinary refractive index of liquid crystal.

The refractive index of the above $SiO_2$ film is usually about 1.46, which is lower than the ordinary refractive index of liquid crystal, whereby it is not easy to obtain a good characteristic. Further, the ordinary refractive index of liquid crystal is usually lower than the extraordinary refractive index. Accordingly, by the following method, the projections and recesses having a refractive index which substantially agrees to the ordinary refractive index of liquid crystal, can easily be prepared.

Namely, a $SiO_x$ film (1<x<2) can be formed by film-forming a mixture of SiO having a high refractive index and $SiO_2$ having a low refractive index, by e.g. a vapor deposition method. Otherwise, a $SiO_x$ film (1<x<2) can be formed by gradually increasing the oxygen partial pressure in the atmosphere gas in the vapor deposition apparatus during film-forming SiO by a vapor deposition method. This $SiO_x$ film is an oxide of Si. Accordingly, when $CF_4$ is, for example, used as the etching gas, the dry etching speed tends to be high due to the high volatility of $CF_4$, and the etching selectivity ratio with the glass substrate tends to be good. When the $SiO_x$ film is employed, it is possible to bring the refractive index of the projections and recesses or the projections to substantially the same level as the ordinary refractive index or extraordinary refractive index of liquid crystal.

The $SiO_xN_y$ film can be made a film having a refractive index close to the ordinary refractive index or extraordinary refractive index of liquid crystal by properly selecting x and y. Such a $SiO_x$ film or a $SiO_xN_y$ film is readily precisely processable by a dry etching method, such being preferred.

The $SiO_xN_y$ film has a merit in that not only the refractive index can be controlled by the proportions of x and y, deterioration of the optical properties such as light absorption can be prevented within a relatively wide proportional range by adjusting y>0. Further, in the case of controlling the oxidation number as in the case of $SiO_x$, there is a problem in the reproducibility and stability in mass production. Whereas, in the case of $SiO_xN_y$ where y>0, the valence electrons are basically close to a satisfied condition, whereby there is a merit that the reproducibility, stability and reliabilities are all excellent.

Specifically, to bring the refractive index of the transparent thin film to a level of the ordinary refractive index (about 1.48 to 1.54) of liquid crystal, x and y may be adjusted at a level of $1.65 \leq x \leq 1.85$ and $0 < y \leq 0.2$. Further, in order to bring the refractive index of the transparent thin film to a level of the extraordinary refractive index (about 1.55 to 1.8) of liquid crystal, x and y may be adjusted to a level of $0.6 \leq x \leq 1.65$ and $0.2 \leq y \leq 0.9$. The values of x and y varies depending upon the forming method or the forming conditions of a transparent thin film, and they may be optimized by experiments.

As a method for forming $SiO_xN_y$, a plasma CVD method is preferably employed. However, a reactive direct current sputtering method wherein sputtering is carried out in an atmosphere having $O_2$ gas, $N_2$ gas and $N_2O$ gas mixed in the predetermined proportions using an electrically conductive Si substrate as a target, is more preferred, since the film forming rate is high as compared with the plasma CVD method.

Specifically, the projections and recesses are formed as follows. A transparent thin film is formed on the surface of a transparent substrate such as a polished glass substrate by a plasma CVD method or a reactive direct current sputtering method. Specifically, a $SiO_xN_y$ film is formed by adjusting the proportions of oxygen and nitrogen so as to bring the refractive index close to both the ordinary refractive index of liquid crystal and the refractive index of the transparent substrate (the refractive index of both being about 1.5), or close to the extraordinary refractive index of liquid crystal.

Then, a photoresist is coated by e.g. a spin coating method on the $SiO_xN_y$ film, and a photomask having a predetermined pattern is intimately put on the photoresist film, followed by exposure with ultraviolet rays and then by photoresist development treatment to form a lattice-like pattern of the photoresist on the surface of the transparent substrate. Using the lattice-like pattern of the photoresist as a mask, dry etching is further carried out by means of a gas such as $CF_4$, $C_2F_6$, $C_3F_8$ or $CHF_3$ to form lattice-like projections and recesses for an optically anisotropic diffraction grating, having a depth of from 1 to 6 μm and a pitch of from 2 to 50 μm.

In the foregoing, a single diffracting element has been described. However, it is for example, possible that diffracting elements having a plurality of liquid crystals filled on a transparent substrate of a size of 120×120 mm, are formed, and they are finally individually separated. With respect to a case wherein the refractive index of the lattice-like projections and recesses is adjusted to substantially agree to the ordinary refractive index of liquid crystal, and the liquid crystal is not twisted, the operation will be explained.

Liquid crystal is aligned in a direction (a direction perpendicular to the paper surface in FIG. 1) substantially parallel with the longitudinal direction of the lattice-like projections and recesses. However, the liquid crystal and the projections and recesses have an equal refractive index to P-wave (the polarized light component having a polarization direction which is in parallel with the paper surface in FIG. 1) entered from the light source (from below in FIG. 1). Namely, the optically anisotropic diffraction grating becomes transparent to P-wave. Therefore, P-wave receives no change and enters into the quarter-wave sheet as it is and changes into a circularly polarized light, which passes through an aspherical lens as the object lens, and light of substantially 100% will reach the recording surface of the optical recording medium.

A reflected light reflected by the above recording surface and returned by passing again through the aspherical lens, passes again through the quarter-wave sheet and changes into S-wave (a polarized light component having a polarization direction which is perpendicular to the paper surface in FIG. 1) having a polarization direction which is different by 90°. When S-wave enters into the optically anisotropic diffraction grating, the refractive indices of the liquid crystal and the projections and recesses are different this time, and they function as a diffraction grating, whereby a diffraction efficiency will be obtained at the maximum of 40% as +primary light and at the maximum of about 40% as −primary light. A go and return efficiency of 40% is obtainable when a detector for detecting +primary light or −primary light is disposed at either side, and a go and return efficiency in a total of 80% can be obtained when detectors are provided at both sides.

Further, when the above projections and recesses are formed to have sloping shapes (saw-tooth shapes), a go and return efficiency of from about 70 to 90% is obtainable, and when they were formed to have stepped shapes of three steps, a go and return efficiency of about 81% is obtainable.

In such a case, in the going direction, no significant difference is observed irrespective of on which substrate the grating is formed. However, in the diffracted return direction, a higher diffraction efficiency is observed by providing the grating on the substrate on the optical recording medium side than by providing the grating on the light source side. The reason for this is not known. However, it is considered that when the grating is provided on the light source side, the light passes through liquid crystal (optically anisotropic material) and then reaches the diffracting section, and the light may receive some optical change (disturbance) during this period.

When the refractive index of the lattice-like projections and recesses is made to substantially agree to the extraordinary refractive index of liquid crystal, when S-wave (light having a polarization direction perpendicular to the paper surface in FIG. 1) from the light source is permitted to enter, the light advances straight in the going direction and is diffracted in the returning direction in the same manner as described above.

Here, when the refractive index of the first glass substrate is about 1.5 which is substantially equal to the ordinary refractive index of liquid crystal, and the transparent thin film is present only at the projections, and the refractive index of the projections is substantially equal to the extraordinary refractive index of liquid crystal, the liquid crystal and the projections of the transparent thin film will be in contact with the first glass substrate. Due to the difference of 0.3 in the refractive index between the transparent thin film and liquid crystal, and the first and second glass substrates, reflection occurs at the interfaces. The reflectance at the above interface is about 0.8% as calculated per interface. The transmittance taking such reflection loss into consideration is 98.4% with two surfaces, and the loss will be 1.6%.

Further, also in the return direction, reflectance by the interface will occur at the optically anisotropic diffraction grating. It is difficult to accurately estimate this reflection loss, but it is calculated on the assumption that the area of the projections is substantially one half, and one half of light is reflected at the two interfaces. In such a case, the transmittance of light will be 99.2%, and the reflection loss will be 0.8%. From the foregoing, in the total of the going and returning directions, the transmittance will be 97.6%, and the reflection loss is assumed to be 2.4%. However, even in the case of the above P-wave input, a reflection loss of 1.6% is unavoidable, and the difference from the S-wave input in the present invention is believed to be slight and at a practically no problematic level.

Further, there is a case where a thin film of the transparent material remains at the bottom of the recesses of the projections and recesses for a reason of practical production. In such a case, the reflection loss is assumed to be about 3.2%. Even such a construction may be employed.

In the above example, the liquid crystal is not twisted, but the liquid crystal may be twisted so long as the lattice-like projections and recesses correspond to the polarization direction.

EXAMPLES

Example 1

The structure of Example 1 is shown in FIG. 1. On one surface of a glass substrate 1 having a relatively small alkali component having a thickness of 1 mm and a size of 10×10 mm and a refractive index of 1.54, lattice-like projections and recesses 2 having a rectangular cross-section and having a depth of 1.55 μm and a pitch of 9 μm, were formed by a photolithography method and a dry etching method.

Specifically, on one surface of a glass substrate 1 having both surfaces polished, a photoresist is coated by a spin coating method. Then, a photomask having a predetermined pattern is intimately put on the photoresist film, followed by exposure with ultraviolet rays and then by photoresist developing treatment to form a lattice-like pattern of the photoresist on the surface of the transparent substrate. Using the lattice-like pattern of the photoresist as a mask, dry etching was further carried out by means of $CF_4$ gas to form the projections and recesses.

A polyimide film 4 was formed as an alignment film for aligning liquid crystal, on one surface of a second glass substrate 3 having a relatively small alkali component, and rubbing treatment for alignment was carried out. The two glass substrates were laminated so that the surface of the above glass substrate 1 on which the projections and recesses 2 were formed and the surface of the second glass substrate 3 on which the polyimide film 4 was formed, faced each other, and the rubbing direction of the polyimide film 4 and the stripe direction of the above projections and recesses 2 were directed in the same direction, and the periphery of the two glass substrates was sealed with an epoxy resin 5 containing a spherical spacer having a diameter of about 4 μm, except for the inlet for injecting liquid crystal.

Liquid crystal 6 (nematic liquid crystal, P-008, tradename, manufactured by Merck Co., ordinary refractive index: 1.525, extraordinary refractive index: 1.771) was vacuum-injected from the inlet for injecting liquid crystal. At that time, $\Delta N=0.23$, $D=1.55$ (μm), $\lambda_0=678$ (nm), and D was set so that $D\Delta N=\lambda_0/2$ was satisfied at 35° C.

On the surface on the opposite side of the polyimide film 4 of the above second glass substrate 3, a quarter-wave film 7 was laminated and bonded by a transparent adhesive, and further a photopolymer 8 to reduce the wave front aberration and a third glass substrate 9 were laminated and bonded thereon to obtain a diffracting element 10. An anti-reflection film by means of a dielectric multilayer film was applied at the light incoming portion 11 from a light source and a light outgoing portion 12 of the diffracting element 10.

As the light source, a semiconductor laser (to be provided below the diffracting element 10 in FIG. 1, not shown) was used, and when P-wave (a polarized light component parallel to the paper surface) having a wavelength of 678 nm was permitted to enter, the transmittance of P-wave was about 97%. Further, the reflected light (circularly polarized light) from an optical disc (to be provided above the diffracting element 10 in FIG. 1, not shown) was changed to S-wave (a polarized light component perpendicular to the paper surface) by the quarter-wave film 7. This S-wave was diffracted by the optically anisotropic diffraction grating, whereby the diffraction efficiency of +first-order (diffraction) light was 33%, and the diffraction efficiency of –first-order (diffraction) light was 33%. As a result, the going efficiency was about 97%, and the go and return efficiency was about 64% (±first-order (diffraction) light detection).

Example 2

Preparation was carried out in the same manner as in Example 1 except that the cross-sectional shapes of the projections and recesses formed in the glass substrate 1 were changed to saw-tooth shapes as shown in FIG. 2. In Example 2, the transmittance of P-wave was about 97%, the diffraction efficiency of +first-order (diffraction) light of S-wave was about 75%, and the diffraction efficiency of –first-order (diffraction) light was about 2%. As a result, the going efficiency was about 97%, and the go and return efficiency was about 73% (±first-order (diffraction) light detection).

Example 3

Preparation was carried out in the same manner as in Example 1 except that the cross-sectional shapes of the projections and recesses formed in the glass substrate 1 ere changed to stepped shapes of three steps as shown in FIG. 3. In Example 3, the transmittance of P-wave was about 79%, and the diffraction efficiency of +first-order (diffraction) light of S-wave was about 70%, and the diffraction efficiency of –first-order (diffraction) light was about 2%. As a result, the going efficiency was about 97%, and the go and return efficiency was about 68% (±first-order (diffraction) light detection).

Example 4

The structure was the same as in Example 1 except that no polyimide film 4 was formed. In this case, liquid crystal 6 was aligned solely by the aligning force of the projections and recesses 2. In Example 4, the transmittance of P-wave was about 97%, and the diffraction efficiency of +first-order (diffraction) light of S-wave was about 31%, and the diffraction efficiency of –first-order (diffraction) light was about 30%. As a result, the going efficiency was about 97%, and the go and return efficiency was about 59% (±first-order (diffraction) light detection).

Example 5

Example 5 is shown in FIG. 4. On a first glass substrate 1 having a size of 10 mm×10 mm, a thickness of 0.5 mm and a refractive index of 1.52, a transparent thin film of $SiO_x$ (x≈1.2) having a refractive index of 1.8 and a depth of 1.2 μm, was formed by a vacuum deposition method. Then, the transparent thin film of $SiO_x$ (x≈1.2) was formed into projections having a pitch (cycle) of 10 μm by a photolithographic method and a dry etching method thereby to form lattice-like projections and recesses 22 having rectangular cross-sectional shapes in a plane perpendicular to the longitudinal direction. By this etching, the transparent thin film remained only at the projections, and at the recesses, the glass substrate surface was exposed.

A second glass substrate 23 having a size of 10 mm×10 mm, a thickness of 0.5 mm and a refractive index of 1.52, was prepared, and on its surface on the side in contact with liquid crystal 26, a polyimide alignment film 24 was formed. The first and second glass substrates 21 and 25 were laminated and bonded so that the rubbing direction was along the stripe direction of the above projections and recesses 22. At that time, the periphery of the two glass substrates was sealed except for an opening for injection of liquid crystal.

Specifically, the procedure was as follows. An epoxy resin (not shown in FIG. 4) containing a 4 μm spherical spacer was coated along the periphery of the first glass substrate 21, and the second glass substrate 25 was mounted thereon. Thereafter, in a reduced pressure atmosphere, a mixed liquid crystal composition (BL009, tradename, manufactured by Merck Co., nematic liquid crystal, $\Delta n=0.2915$, ordinary refractive index=1.5266, extraordinary refractive index= 1.8181, phase transition temperature to solid liquid crystal phase≦–20° C., phase transition temperature to isotropic phase=108° C.) was injected as liquid crystal 26. The above opening was closed with a sealing resin to obtain an optically anisotropic diffraction grating.

Then, on the second glass substrate 23 (on the surface on the opposite side of the projections and recesses), a phase difference film 27 made of a polycarbonate, was bonded by means of a transparent adhesive 25. Further, a UV curable acrylic resin 28 was coated thereon. Further, a third glass substrate 29 was mounted thereon, followed by irradiation with ultraviolet rays to laminate and bond the third glass substrate 29. Further, with respect to the entire element, an anti-reflection film was formed on the light-incoming surface and the light-outgoing surface to obtain a diffracting element.

As a result of the foregoing, the transmittance was 95% to S-wave (light in the polarization direction perpendicular to the paper surface in FIG. 4) having a wavelength of 678 nm from a semiconductor laser (not shown in FIG. 4). To P-wave (light in the polarization direction parallel to the paper surface) from an optical disc (not shown in FIG. 4), the diffraction efficiency of first-order (diffraction) light was 36.9%, and the diffraction efficiency of −first-order (diffraction) light was 34.0%.

Thus, the go and return efficiency was 67.3%, which was a practically sufficiently high efficiency. Further, the wave front aberration of transmitted light was at most 0.015 $\lambda_{rms}$ (root mean square) at the center portion (within a circle having a diameter of 2 mm) of the light incoming and outgoing surfaces of the diffracting element.

Example 6

Example 6 is shown in FIG. 5. The same parts as in Example 5 are indicated by the same symbols. On a first glass substrate 1 having a size of 10 mm×10 mm, a thickness of 0.5 mm and a refractive index of 1.52, a photosensitive polyimide (Photonece, tradename, manufactured by Toray Co., refractive index: 1.78) was coated in a thickness of 1.3 $\mu$m by a spin coating method. Thereafter, the photosensitive polyimide film was formed into projections with a pitch (cycle) of 8 $\mu$m by a photolithographic method thereby to form lattice-like projections and recesses 32 having rectangular cross-sectional shapes in a plane perpendicular to the longitudinal direction. Thereafter, rubbing treatment was carried out in the stripe direction of the above projections and recesses 32. The subsequent steps were carried out in the same manner as in Example 5 to obtain a diffracting element.

As a result of the foregoing, the transmittance was 90% to S-wave (light in a polarization direction perpendicular to the paper surface in FIG. 5) having a wavelength of 678 nm from a semiconductor laser (not shown in FIG. 5). To P-wave (light in a polarization direction perpendicular to the paper surface in FIG. 5), the diffraction efficiency of first-order (diffraction) light was 34.6%, and the diffraction efficiency of −first-order (diffraction) light was 31.9%.

Thus, the go and return efficiency was 59.8%, which was a practically sufficiently high efficiency. Further, the wave front aberration of transmitted light was at most 0.015 $\lambda_{rms}$ at the center portion (within a circle having a diameter of 2 mm) of the light incoming and outgoing surfaces of the diffracting element.

Example 7

In the same manner as in Example 6, the structure of FIG. 5 was employed. On a first glass substrate 21 having a size of 10 mm×10 mm, a thickness of 0.5 mm and a refractive index of 1.52, $SiO_xN_y$ (x=0.7, y=0.8) was formed into a film having a thickness of 1.4 $\mu$m by reactive sputtering. The film-forming conditions were such that the substrate temperature was 200° C., a mixed gas was used with a nitrogen gas flow rate of 17.4 SCCM and an oxygen gas flow rate of 0.2 SCCM, and the gas pressure during the film formation was 5×10$^{-3}$ torr.

The formed film was 680 nm and had a refractive index of about 1.8, and no absorption was observed to the wavelength of at least 600 nm. Thereafter, a transparent thin film of $SiO_xN_y$ (x=0.7, y=0.8) was formed into projections with a pitch (cycle) of 10 $\mu$m by a photolithographic method and a dry etching method thereby to form lattice-like projections and recesses 32 having rectangular cross-sectional shapes in a plane perpendicular to the longitudinal direction. Thereafter, a polyimide film was coated on both substrates, and rubbing treatment was carried out in the stripe direction of the projections and recesses 32. The subsequent steps were carried out in the same manner as in Example 5 to obtain a diffracting element.

As a result of the foregoing, the transmittance was 80% to S-wave (light in the polarization direction perpendicular to the paper surface in FIG. 5) having a wavelength of 678 nm from a semiconductor laser (not shown in FIG. 5). To P-wave (light in a polarization direction perpendicular to the paper surface in FIG. 5) from an optical disc (not shown in FIG. 5), the diffraction efficiency of first-order (diffraction) light was 33.7%, and the diffraction efficiency of −first-order (diffraction) light was 32.8%.

Thus, the go and return efficiency was 53.1%, which was a practically sufficiently high efficiency. Further, the wave front aberration of transmitted light was at most 0.015 $\lambda_{rms}$ at the center portion (within a circle having a diameter of 2 mm) of the light incoming and outgoing surfaces of the diffracting element.

Further, this $SiO_xN_y$ (x=0.7, y=0.8) film can also be formed by a plasma CVD method using $SiH_4$, $N_2O$ and $NH_3$, by controlling the flow rate ratio of $N_2O$ to $NH_3$ to a level of 1:24.

Example 8

In the same manner as in Example 7, $SiO_xN_y$ (x=0.7, y=0.8) was formed into a film having a thickness of 1.4 $\mu$m. Thereafter, the transparent thin film of $SiO_xN_y$ (x=0.7, y=0.8) was formed into projections with a pitch (cycle) of 5 $\mu$m by a photolithographic method and a dry etching method thereby to form lattice-like projections and recesses having rectangular cross-sectional shapes in a plane perpendicular to the longitudinal direction. Thereafter, a polyimide film was coated on both substrates, and rubbing treatment was carried out in the stripe direction of the projections and recesses. The subsequent steps were carried out in the same manner as in Example 5 to obtain an optically anisotropic diffraction grating.

Then, in the same manner as in FIG. 5, a phase difference film was bonded on the second glass substrate. Further, a UV curable acrylic resin was coated thereon, and further a third glass substrate was mounted thereon, followed by irradiation with ultraviolet rays to laminate and bond the third glass substrate. Further, with respect to the entire element, an anti-reflection film was formed on the light incoming surface and the light outgoing surface to obtain a diffracting element.

To P-wave (light in a polarization direction parallel to the paper surface in FIG. 5) having a wavelength of 650 nm from a semiconductor laser, the light transmittance was 95.5% in the going direction. Further, the diffraction efficiency in the returning direction was 74.6%.

Example 9

A phase difference film was bonded on the first glass substrate of the optically anisotropic diffraction grating in Example 8. Further, a UV curable acrylic resin was coated thereon, and further a third glass substrate was mounted thereon, followed by irradiation with ultraviolet rays to laminate and bond the third glass substrate. Further, with respect to the entire element, an anti-reflection film was formed on the light incoming surface and the light outgoing surface to obtain a diffracting element. In this manner, a construction having the second substrate disposed on a light source side, was obtained.

To P-wave (light in a polarization direction parallel to the paper surface in FIG. 5) having a wavelength of 650 nm from a semiconductor laser, the light transmittance was 95.6% in the going direction. Further, the diffraction efficiency in the returning direction was 78.5%, which was a higher diffraction efficiency than in Example 8.

Example 10

On one surface of the same glass substrate as in Example 5, a $SiO_xN_y$ film having a thickness of 1.2 μm was formed solely by a plasma CVD method. At that time, $SiH_4$, $N_2O$ and $NH_3$ were used in a flow rate ratio of 1:7.5:2.5 as the atmosphere gas in the plasma CVD apparatus, and the film was formed at the transparent substrate temperature of 300° C. In the $SiO_xN_y$ film, x and y were about 1.8 and 0.17, respectively.

The $SiO_xN_y$ film was subjected to etching in a lattice pattern by a photolithographic method and a dry etching method to form projections and recesses for a diffraction grating having rectangular cross-sections with a depth of about 1.2 μm and a pitch of 9 μm, on the transparent substrate.

In the same manner as in Example 5, the two glass substrates were sealed with an epoxy resin (not shown), and the same liquid crystal was vacuum-injected. Further, in the same manner as in Example 5, a phase difference film was laminated and bonded on the second glass substrate by means of a transparent adhesive, and further, a third glass substrate was laminated and bonded thereon by a UV curable acrylic resin. Further, an anti-reflection film was formed to obtain a diffracting element.

Using a semiconductor laser as a light source, P-wave (a polarized light component parallel to the paper surface in FIG. 4) having a wavelength of 678 nm was permitted to enter, whereby the transmittance of P-wave was about 97%. Further, the reflected light (a circularly polarized light) from an optical disc (to be provided above the diffracting element in FIG. 4, not shown) is changed to S-wave (a polarized light component perpendicular to the paper surface) by a phase difference film, and this S-wave was diffracted by the optically anisotropic diffraction grating, whereby the diffraction efficiency of +first-order (diffraction) light was 34%, and the diffraction efficiency of −first-order (diffraction) light was 34%. In FIG. 4, light from the light source is described as S-wave, but in this Example, this becomes P-wave.

As a result, the going efficiency was about 97%, and the go and return efficiency was about 66% (±first-order (diffraction) light detection).

Example 11

The same structure as in Example 10 was employed except that no polyimide film was formed. In this case, liquid crystal was aligned solely by the aligning force of the projections and recesses. In this Example, the transmittance of P-wave was about 94%, and the diffraction efficiency of +first-order (diffraction) light of S-wave was about 29% and the diffraction efficiency of −first-order (diffraction) light was about 28%. As a result, the going efficiency was about 94%, and the go and return efficiency was about 54% (±first-order (diffraction) light detection).

Example 12

The operation was carried out in the same manner as in Example 10 except that the $SiO_xN_y$ film was formed by a reactive direct current sputtering method. The atmosphere gas in the reactive direct current sputtering apparatus was $N_2:O_2$=19:1 (flow rate ratio), the temperature of the transparent substrate was room temperature, and the direct current power was 0.2 W. A $SiO_xN_y$ film wherein x=1.7 and y=0.18, was formed.

In this Example, the transmittance of P-wave was about 93%, and the diffraction efficiency of +first-order (diffraction) light of S-wave was about 28% and the diffraction efficiency of −first-order (diffraction) light was about 27%. As a result, the going efficiency was about 93%, and the go and return efficiency was about 51% (±first-order (diffraction) light detection).

INDUSTRIAL APPLICABILITY

The present invention can be produced with good mass productivity with a substrate area larger than a berefringence crystal, without using an expensive material such as berefringence crystal, and a high light-utilization efficiency can be obtained as compared with an isotropic grating such as a relief-type diffraction grating.

The basic structure such as a pitch, of the optically anisotropic diffraction grating is defined by the transparent substrate and not by liquid crystal itself, whereby it is excellent in the temperature characteristic and the environmental durability. Further, liquid crystal can be aligned without providing a film for aligning liquid crystal, such as a polyimide film. with respect to the grating pattern of the optically anisotropic diffraction grating, a complex grating pattern can be readily formed with good mass productivity by a CGH (Computer Generated Hologram) method using e.g. a mask for exposure.

Further, a phase difference sheet such as a quarter-wave sheet or a phase difference film is laminated within the diffracting element, whereby the productivity is excellent, and the entire element can be made compact.

According to the present invention, an optical head device can easily be obtained which has a high light-utilization efficiency such that to each of the incoming light (P-wave) having a polarization in a direction perpendicular to the stripe direction of the optically anisotropic diffraction grating and the incoming light (S-wave) having a polarization parallel thereto, the light is transmitted at a high light transmittance in the going direction, and the light undergoes a desired diffraction in the returning direction. Further, the optically anisotropic diffraction grating to be used for this, can be industrially produced with good productivity.

Especially when $SiO_xN_y$ is used as the transparent thin film, the refractive indices of the projections and recesses and the liquid crystal can easily be adjusted, and formation of precise shapes can be carried out by a dry etching method.

What is claimed is:

1. An optical head device whereby writing of information and/or reading out of information is carried out by irradiating an optical recording medium with light from a light source, through a diffracting element, wherein the diffracting element is provided with an optically anisotropic diffraction grating having lattice-like projections and recesses formed on the surface of a transparent substrate, and said projections and recesses are filled with a liquid crystal having an optical anisotropy, and at least the projections among the projections and recesses are formed by a transparent thin film made of $SiO_xN_y$ ($0 \leq x < 2$, $0 \leq y < 1.3$), provided on the surface of the transparent substrate, which employs a diffracting element wherein at least the projections among the projections and recesses are substantially equal to the ordinary refractive index or extraordinary refractive index of the liquid crystal.

2. An optical head device whereby writing of information and/or reading out of information is carried out by irradiating an optical recording medium with light from a light source, through a diffracting element, wherein the diffracting element is provided with an optically anisotropic diffraction grating having lattice-like projections and recesses formed on the surface of a transparent substrate, and said projections and recesses are filled with a liquid crystal having an optical anisotropy, and at least the projections among the projections and recesses are formed by a transparent thin film made of $SiO_xN_y$ ($0 \leq x < 2$, $0 \leq y < 1.3$), provided on the surface of the transparent substrate, wherein a phase difference element is laminated on the liquid crystal side of the optically anisotropic diffraction grating to constitute the diffracting element, the phase difference element being a phase difference sheet or phase difference film, at least one side of which is covered by an organic resin, and the phase difference sheet or phase difference film being sandwiched with transparent flat substrates.

* * * * *